US010205762B2

(12) United States Patent
Leung (10) Patent No.: US 10,205,762 B2
(45) Date of Patent: Feb. 12, 2019

(54) SYSTEM, METHOD AND DEVICES FOR BLUETOOTH PARTY-MODE (71) Applicant: KONINKLIJKE PHILIPS N.V., Eindhoven (NL)

(72) Inventor: Po Chun Leung, Fan Ling (HK)

(73) Assignee: KONINKLIJKE PHILIPS N.V., Eindhoven (NL)

(*) Notice: Subject to any disclaimer, the term of this patent is extended or adjusted under 35 U.S.C. 154(b) by 421 days.

(21) Appl. No.: 14/900,659

(22) PCT Filed: Jun. 20, 2014

(86) PCT No.: PCT/EP2014/062980
§ 371 (c)(1),
(2) Date: Dec. 22, 2015

(87) PCT Pub. No.: WO2014/206864
PCT Pub. Date: Dec. 31, 2014

(65) Prior Publication Data
US 2016/0156687 A1 Jun. 2, 2016

(30) Foreign Application Priority Data
Jun. 28, 2013 (EP) .................................... 13174222

(51) Int. Cl.
G06F 15/16 (2006.01)
H04W 4/80 (2018.01)
(Continued)

(52) U.S. Cl.
CPC ........ H04L 65/4092 (2013.01); G11B 27/105 (2013.01); H04L 12/6418 (2013.01);
(Continued)

(58) Field of Classification Search
CPC ...... H04W 4/80; H04W 4/008; G11B 27/105; H04L 12/6418; H04L 65/4084; H04L 67/125; H04L 67/2819
(Continued)

(56) References Cited
U.S. PATENT DOCUMENTS

2004/0078383 A1* 4/2004 Mercer ................ G11B 19/025
2006/0195521 A1* 8/2006 New .................. G06F 17/30766
709/204
(Continued)

FOREIGN PATENT DOCUMENTS

WO 2011119816 A1 9/2011
WO 2012166734 A2 12/2012

OTHER PUBLICATIONS

Lambers, "Party Jukebox: Supporting Co-Located Music Consumption in a Public Environment", Ludwig-Maximillians Universitat, Munchen, Undated, pp. 1-23.
(Continued)

Primary Examiner — Moustafa M Meky
Assistant Examiner — Elizabeth Kassa (57) ABSTRACT A media system (100), a method, devices and software for managing playback of media content (112, 122) from multiple devices (110, 120) is disclosed. The media system comprises a coordinator device, a first content device (110), a second content device (120), and a playback device (150). The first and second content device being portable media devices that comprise and send a respective first and second playlist (115) and (125), based on a preference of a respective first and second user, to a coordinator device. The coordinator device determines a master playlist (135) based on the first and second playlist, selects a media content according to the master playlist, selects a content device corresponding to the selected media content, and sends a playback command to the selected content device. The
(Continued)

selected content device retrieves the selected media content and plays the selected media content via the playback link on the playback device.

10 Claims, 2 Drawing Sheets

(51) Int. Cl.
    *G11B 27/10*     (2006.01)
    *H04L 12/64*     (2006.01)
    *H04L 29/06*     (2006.01)
    *H04L 29/08*     (2006.01)

(52) U.S. Cl.
    CPC ........ *H04L 65/4084* (2013.01); *H04L 67/125* (2013.01); *H04L 67/2819* (2013.01); *H04W 4/80* (2018.02)

(58) Field of Classification Search
    USPC ......................................................... 709/219
    See application file for complete search history.

(56) References Cited

U.S. PATENT DOCUMENTS

| | | | |
|---|---|---|---|
| 2008/0086379 A1* | 4/2008 | Dion | G06F 3/04842 705/14.1 |
| 2008/0162668 A1* | 7/2008 | Miller | H04L 65/40 709/219 |
| 2009/0222864 A1* | 9/2009 | Drakoulis | G06Q 30/0603 725/87 |
| 2010/0162324 A1* | 6/2010 | Mehta | H04N 7/17318 725/61 |
| 2011/0283236 A1* | 11/2011 | Beaumier | G07F 11/002 715/835 |
| 2011/0314388 A1 | 12/2011 | Wheatley | |
| 2013/0005465 A1 | 1/2013 | Murphy et al. | |
| 2013/0007017 A1* | 1/2013 | Jellison, Jr. | G06F 17/30038 707/748 |
| 2013/0212714 A1* | 8/2013 | Goh | G06F 1/1626 726/34 |

OTHER PUBLICATIONS

Manglani et al, "Party Play", Georgia Tech, Undated, pp. 1-3.

\* cited by examiner

SYSTEM, METHOD AND DEVICES FOR BLUETOOTH PARTY-MODE

CROSS-REFERENCE TO PRIOR APPLICATIONS

This application is the U.S. National Phase application under 35 U.S.C. § 371 of International Application No. PCT/EP2014/062980, filed on Jun. 20, 2014, which claims the benefit of European Patent Application No. 13174222.3, filed on Jun. 28, 2013. These applications are hereby incorporated by reference herein.

FIELD OF THE INVENTION

The invention relates to a media system for managing playback of media content using multiple devices. Playback is done according to a master playlist that lists media content and indicates an order for playing the media content.

BACKGROUND OF THE INVENTION

WO 2011/119816 A1 describes a media system being a digital variant of a classic juke-box concept. The media system enables a visitor of a venue, e.g. a restaurant, to use his mobile phone in order to choose music from a central music collection and to purchase the right that the music will be played at the venue. The mobile phone connects via a network to a media server that comprises the central music collection. The media server subsequently adds the chosen music to a jukebox playlist. The media server then plays the music in the jukebox playlist according to the playlist via an audio system at the venue.

A drawback of the media system is that the jukebox playlist comprises only music from the central music collection to be played on the audio system, and thereby limits the choice of users to the central music collection offered by the media server. An improved media system for playback of is therefore desired.

SUMMARY OF THE INVENTION

It is an object of the invention to provide a system for managing playback of media content using multiple devices.

The invention discloses a media system for managing playback of media content, the media system comprising a coordinator device, a first content device, a second content device, and a playback device.

The first content device being a portable media device comprises a first playlist based on a preference of a first user, the first playlist listing a reference to a first media content. The first content device is arranged for (a) establishing a first link for communication with the coordinator device, (b) sending the first playlist to the coordinator device, (c) receiving a playback command from the coordinator device for playing the first media content, (d) retrieving the first media content, and (e) establishing a playback link with the playback device for playing the first media content.

The second content device being a portable media device comprises a second playlist based on a preference of a second user, the second playlist listing a reference to second media content. The second content device is arranged for (a) establishing a second link for communication with the coordinator device, (b) sending the second playlist to the coordinator device, (c) receiving a playback command from the coordinator device for playing the second media content, (d) retrieving the second media content, and (e) establishing a playback link with the playback device for playing the second media content.

The coordinator device is arranged for: (a) establishing a first and second link for communication with the respective first and second content device, (b) receiving the first and second playlist from the respective first and second content device; (c) composing a master playlist based on the first and second playlist; (d) selecting a media content listed by to the master playlist; (e) selecting a content device listing the selected media content, the content device being one of the first and second content device; and (f) sending a playback command to the selected content device for playing the selected media content.

The master playlist is thus based on the first playlist from the first content device and on the second playlist from the second content device. The first user indicates his preference of the first media content by means of the first playlist. The second user indicates his preference of the second media content by means of the second playlist. The coordinator device determines a master playlist on the basis of the first and second playlist. The coordinator device selects a media content according to the master playlist, and then sends a playback command to a selected content device. The selected content device is the first or second content device, depending on to which content device the selected media content relates. The coordinator device then sends a playback command to the selected content device for playing back the selected media content via the playback device. The invention coordinates playback of media content provided via multiple content devices.

The effect of the invention is that users are not limited to a central media collection for playback of media content on a playback device, but can choose content from their own respective content device for coordinated playback on the playback device. For example, coordinated playback entails composing of a master playlist by interleaving first media content listed in the first playlist with the second media content listed in the second playlist, so that the first and second media content are listed in an alternating manner in the master playlist. The invention thus manages playback of media content from multiple devices with multiple respective users to be played back on the playback device.

A benefit of the current invention is that it provides a highly efficient way of managing playback of multiple media content distributed over respective multiple portable content devices to a single playback device. Data transfer between the coordinator device and (each of) the portable content devices is efficient, because only playlists (listing the media content) are exchanged between them and not media content itself (e.g. an MP3-file), whereas playing back a media content is done from the portable content device that comprises that media content to the playback device.

The invention further discloses a method for managing playback of media content, comprising a coordinator function, a first content function, and a second content function and using a playback device, the coordinator function, the first content function and a second content function being performed by a coordinator device, a first content device and a second content device respectively, the first content device and the second content device being portable media devices.

The first content function provides a first playlist based on a preference of a first user, the first playlist listing first media content. The first content function comprises (a) establishing a first link for communication with the coordinator function, (b) sending the first playlist to the coordinator function, (c) receiving a playback command from the coordinator function for playing the first media content, (d) retrieving the first media content, and (e) establishing a first playback link with the playback device for playing the first media content. The second content function provides a second playlist based on a preference of a second user. The second playlist listing second media content, the second content function comprises (a) establishing a second link for communication with the coordinator function, (b) sending the second playlist to the coordinator function, (c) receiving a playback command from the coordinator function for playing the second media content, (d) retrieving the second media content, and (e) establishing a second playback link with the playback device for playing the second media content. The coordinator function comprises: (a) establishing a first and second link for communication with the respective first and second content function, (b) receiving the first and second playlist from the respective first and second content function, (c) determining a master playlist based on the first and second playlist, (d) selecting a media content according to the master playlist, (e) selecting a content device listing the selected media content, the content device being one of the first and second content device, and (f) sending a playback command to the selected content device for playing the selected media content.

The invention further discloses a media coordinator device for use in the media system. The media coordinator device is arranged for: (a) establishing a first and second link for communication with the respective first and second content device, (b) receiving the first and second playlist from the respective first and second content device; (c) composing a master playlist from at least one of the first and second playlist; (d) selecting a media content according to the master playlist; (e) selecting a content device listing the selected media content, the content device being one of the first and second content device; and (f) sending a playback command to the selected content device for playing the selected media content.

Optionally, the coordinator device is arranged for determining the master playlist based on the first and second playlist by composing the master playlist according to an automated selection function that selects media content listed in the first and second playlist. The automated selection function determines how media content is selected from the first playlist and from the second playlist for a given position in the master playlist.

Optionally, the coordinator device is arranged for determining a master playlist by composing an intermediate playlist using the first and second playlist, sending the intermediate playlist to the first content device, receiving from the first content device a selection of the media content selected from the intermediate playlist by the first user, and listing the media content selected by the first user at the top of the master playlist. The first user selects media content from the intermediate playlist, which is not only based on both the first playlist but also on the second playlist. The first user may thus select from media content provided by both the first content device and by the second content device.

Optionally, the coordinator device is arranged for determining a master playlist by composing an intermediate playlist using at least one of the first and second playlist, sending the intermediate playlist to at least one of the first and second content device, receiving a user vote from the at least one first and second content device, the user vote being related to media content listed by the intermediate playlist, and composing the master playlist based on the intermediate playlist and the user vote. The master playlist is thus based on a popular vote from the first user and the second user based on media content listed in the intermediate playlist.

The invention further discloses a media content device for use in the media system. The media content device being a portable media device comprises a first playlist based on a preference of a first user, the first playlist listing first media content. The media content device is arranged for (a) establishing a first link for communication with the coordinator device, (b) sending the first playlist to the coordinator device, (c) receiving a playback command from the coordinator device for playing the first media content, (d) retrieving the first media content, and (e) establishing a playback link with the playback device for playing the first media content.

It will be appreciated by those skilled in the art that two or more of the above-mentioned options, implementations, and/or aspects of the invention may be combined in any way deemed useful.

Modifications and variations of the mobile device, the method, and/or of the computer program product, which correspond to the described modifications and variations of the mobile device, can be carried out by a person skilled in the art on the basis of the present description.

BRIEF DESCRIPTION OF THE DRAWINGS

These and other aspects of the invention are apparent from and will be elucidated with reference to the embodiments described hereinafter.

In the drawings.

It should be noted that items that have the same reference numbers in different figures, have the same structural features and the same functions. Where the function and/or structure of such an item has been explained, there is no necessity for repeated explanation thereof in the detailed description.

DETAILED DESCRIPTION OF THE INVENTION

This document describes a media system, a method, devices and software for managing playback of media content from multiple devices.

Figure 1:
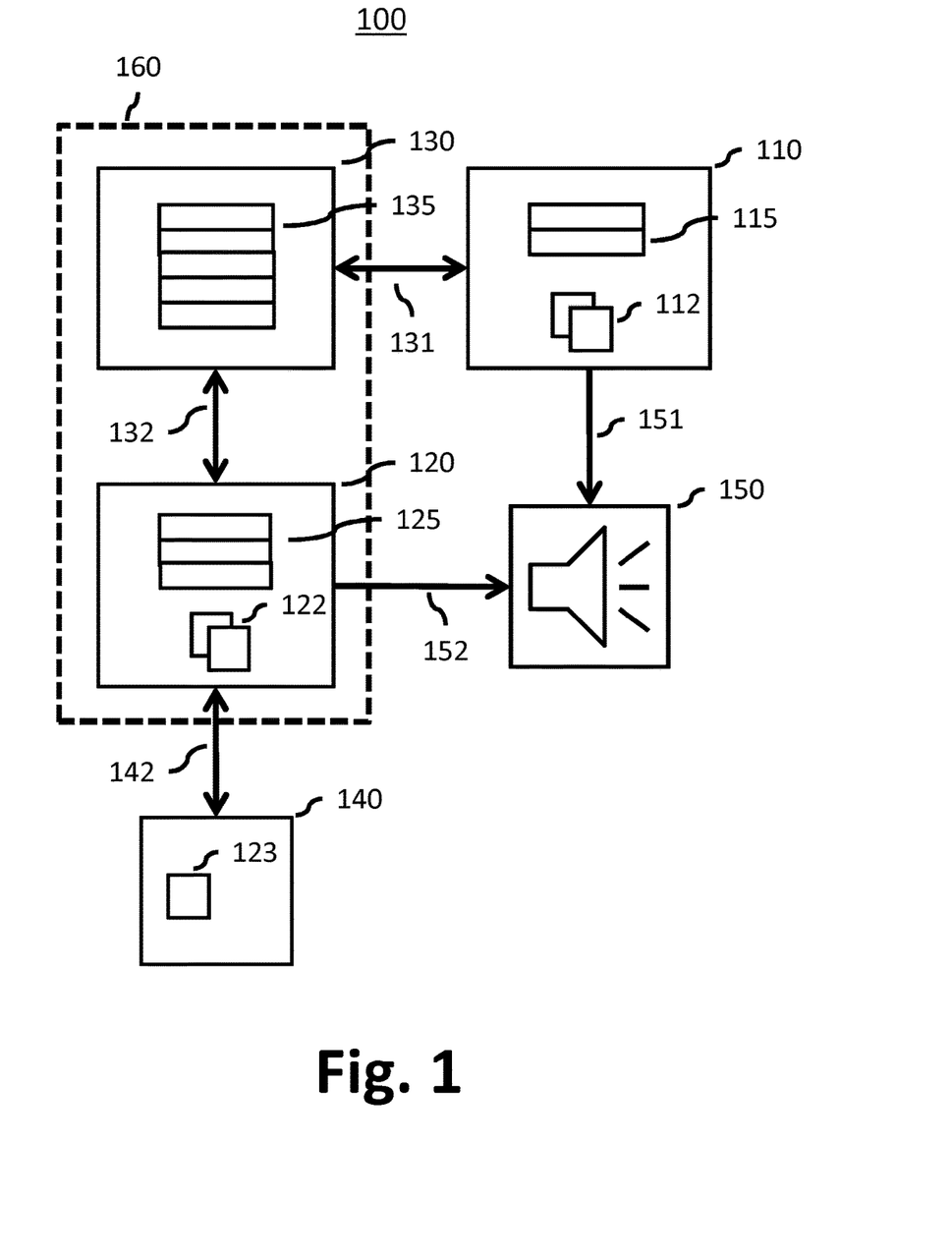
FIG. 1 illustrates the media system having a coordinator unit, a first content unit, a second content unit and a playback device.

FIG. 1 illustrates a media system 100 having a coordinator unit 130, a first content unit 110, a second content unit 120 and a playback device 150. The first content unit 110 comprises a first playlist 115 that lists first media content 112. The second content unit 120 comprises a second playlist 125 that lists second media content 122 and 123. An external server 140 comprises the second media content 123. A playback device 150 is provided for playing media content.

The media system 100 further comprises the following links for communication between units. The coordinator unit 130 and the content unit 110 are arranged to establish a first link 131 for communication between them. The coordinator unit 130 and the content unit 120 are arranged to establish a second link 132 for communication between them. The first content unit 110 and the playback device 150 are arranged to establish a first playback link 151 for playing back media content from the content unit 110. The second content unit 120 and the playback device 150 are arranged to establish a second playback link 152 for playing back media content from the content unit 110. The second content 120 and the external server 140 are arranged to establish a network link 142 to enable the second content unit to retrieve the second media content 123.

When operating, the media system 100 may work as follows.

The first content unit 110 comprises a playlist 115 based on a preference of a first user. The playlists 115 comprises a list that contains a reference to the first media content 112, which may comprise one or more media files. Next, the first content unit 110 establishes a first link 131 with the coordinator unit 130, and subsequently sends the playlist 115 to the coordinator unit 130.

The second unit 120 works operates in a similar manner. The second content unit 120 comprises a playlist 125 based on a preference of a second user. The playlists 125 comprises a list that contains a reference to the second media content 122, which may comprise one or more media files. Next, the second content unit 120 establishes a second link 131 with the coordinator unit 130, and subsequently sends the playlist 125 to the coordinator unit 130.

The coordinator unit 130 has thus received two playlists, the first playlist 115 and the second playlist 125. The coordinator unit 130 composes a master playlist 135, using one or both of the two playlists 115, 125. The composing of the master playlist may be done in several ways, which will be further elaborated below in this document.

For example the master playlist lists one or more references to media content and indicates the order in which the media content is to be played. For example, the media content comprises music, whereas a reference to the music is a song title and/or an artist. The master playlist then indicates that a song listed at the top of the master playlist is to be played first, a song listed second in the master playlist is to be played second, and so on. The coordinator unit 130 thus selects the media content at the top of the playlist for being played back first. Next, the coordinator unit 130 selects a content unit, being either the first content unit 110 or the second content unit 120, that comprises a playlist that lists the selected media content., if the first media content 112 is listed at the top of the master playlist 135, then the selected media content is the first media content 112 and, consequently, the selected content unit is the first content unit 110, because the first playlist 115 lists the first media content 112. The coordinator unit 130 therefore sends a playback command for playing the first media content 112 to the first content unit 110 for being played back. The first content unit 110 receives the playback command and retrieves the first media content from an internal memory (in the first content unit 110) comprising the first media content 112. In order to play back the first media content 112, the first content unit 110 establishes the playback link 151 with the playback device 150. The first media content 112 is then played back at the playback device 150 via the playback link 151.

As another example, consider a case in which the second media content 122 is listed at the top of the master playlist 135 is analogous to the case in the previous paragraph. The selected media content is the second media content 122, the selected content unit is the second content unit 120, the second media content 122 is retrieved from an internal memory (in the second content unit 120), the second content unit 120 establishes a playback link 152 with the playback device 150, and plays back the second media content 122 at the playback device 150 via the playback link 152.

As another example, consider a case in which the second media content 123 is listed at the top of the master playlist 135, which is the same as the case in the previous paragraph, except for the retrieving of the second media content 123. In this particular case, the second media content 123 does not reside in the internal memory of the second content unit 120 but at the external server 140. The second media content 123 therefore establishes a network link 142 for communication with the external server 140, and the second content unit 120 retrieves the second media content 123 via the network link 142.

The media system 100 may be configured using multiple devices, each device comprising one of the units 110, 120 and 130. A content device may comprise one of the two content units 110 and 120. A coordinator device may comprise the coordinator unit 130. A coordinator device 160 may comprise both the coordinator unit 130 and one of the two content units 110 and 120, making the coordinator device also a content device. For example, the coordinator device or the content device may be a smartphone, while the playback device is an audio device that is arranged to play wirelessly streamed music from a content device.

The first playlist 115 is based on a preference of a first user. Consider for example the first user using a smartphone being a content device comprising the first content unit 110, and the first content unit 110 having the first media content 112 being songs. The first user composes the first playlist 115 by songs via the smartphone. The songs may, for example, have been downloaded from an internet music service onto the content device. The smartphone enables the first user to select the one or more songs using software running on the smartphone. The smartphone uses the software to discover a coordinator device via a wireless network and to establish a first link with the coordinator device, which, for example, also is a smartphone. The first playlist 115 is then sent to the coordinator device.

The first playlist 115 may be sent to the coordinator device in response to the first user indicating at the first content device that the playlist 115 is to be sent to the coordinator device. Alternatively, the first user may select multiple songs, while each time that the first user selects a song the software composes a playlist 115 from the (single) and immediately sends that playlist 115 to the coordinator device. The coordinator device in response may add each newly received playlist 115 to the master playlist. Alternatively, the playlist 115 is composed from multiple selected songs and is sent to the coordinator device at regular time intervals, for example 5 minute time intervals. In the latter case, the playlist 115 sent to the coordinator device may only comprise songs that have not been sent earlier to the coordinator device.

The second playlist 125 is based on a preference of a second user. Consider for example the second user using a smartphone being the second content unit 120, while the second media content 122,123 comprises songs. This example is similar in a previous paragraph concerning the first user, but in this example not all the songs are physically at the smartphone, according to FIG. 1. However, for selecting the songs it may not have a consequence, as long as references (e.g. song titles) to the songs are available at the smartphone. Actual media content (i.e. the sound data) of a song may reside an external server. The external server for example is a commercial internet music server or a server hosting personal 'cloud' storage of the second user.

The master playlist 135 may be composed in several ways based on two playlists 115 and 125. The coordinator unit may compose the master playlist according to an automated selection function that selects media content listed in the first and second playlist. The automated selection function determines how media content is selected from the first playlist and from the second playlist for a given position in the master playlist. Thus for a position in the master playlist, the automated selection function selects one of the two playlists 115 and 125 and a position in that selected playlist that lists a media content. That media content is then listed at said position in the master playlist.

The following ways of composing a master playlist 135 may be implemented in the automated selection function. For example, the coordinator unit places an early received playlist higher on the master playlist 135 than a later received playlist. Thus if the second playlist 125 is received earlier than the first playlist 115, then coordinator unit places the second playlist 125 higher than the first playlist 115. Alternatively, the coordinator unit composes the master playlist 135 by merging the first and second playlist 115, 125 and sorting songs in the master playlist 135 on the basis of a specific attribute of the songs, e.g. song title, song duration or release date. Alternatively, songs in the master playlist 135 are listed in random order. Alternatively, the songs that have been played recently are placed low in the master playlist 135, whereas songs that have not been played recently are placed high in the master playlist 135. Alternatively, the master playlist 135 is composed by taking the first song of the first playlist 115 first and the first song of the second playlist 125, and listing those two songs in random order. Alternatively, the master playlist 135 is composed by interleaving songs of the two playlists 115 and 125, so that the songs at even positions in the master playlist 135 are from the first playlist 115 while the songs at odd positions are from the second playlist 125.

Alternatively, the master playlist 135 may be determined via manual selection by a (coordinating) user of the coordinator unit. The coordinating user composes the master playlist 135 by selecting media content from the first playlist 115 and/or the second playlist 125. For example, the coordinating user may compose the master playlist 135 by manually selecting media content from both playlists 115 and 125 according to the order of his personal preference. As another example, the coordinating user may compose the master playlist 135 by selecting a single media content from either playlist 115 or 125. In an embodiment above, wherein a coordinator device 160 comprises both the coordinator unit 130 and the second content unit 120, the user of the coordinator unit 130 may also be the second user, i.e. the user of the second content unit 120.

Figure 2:
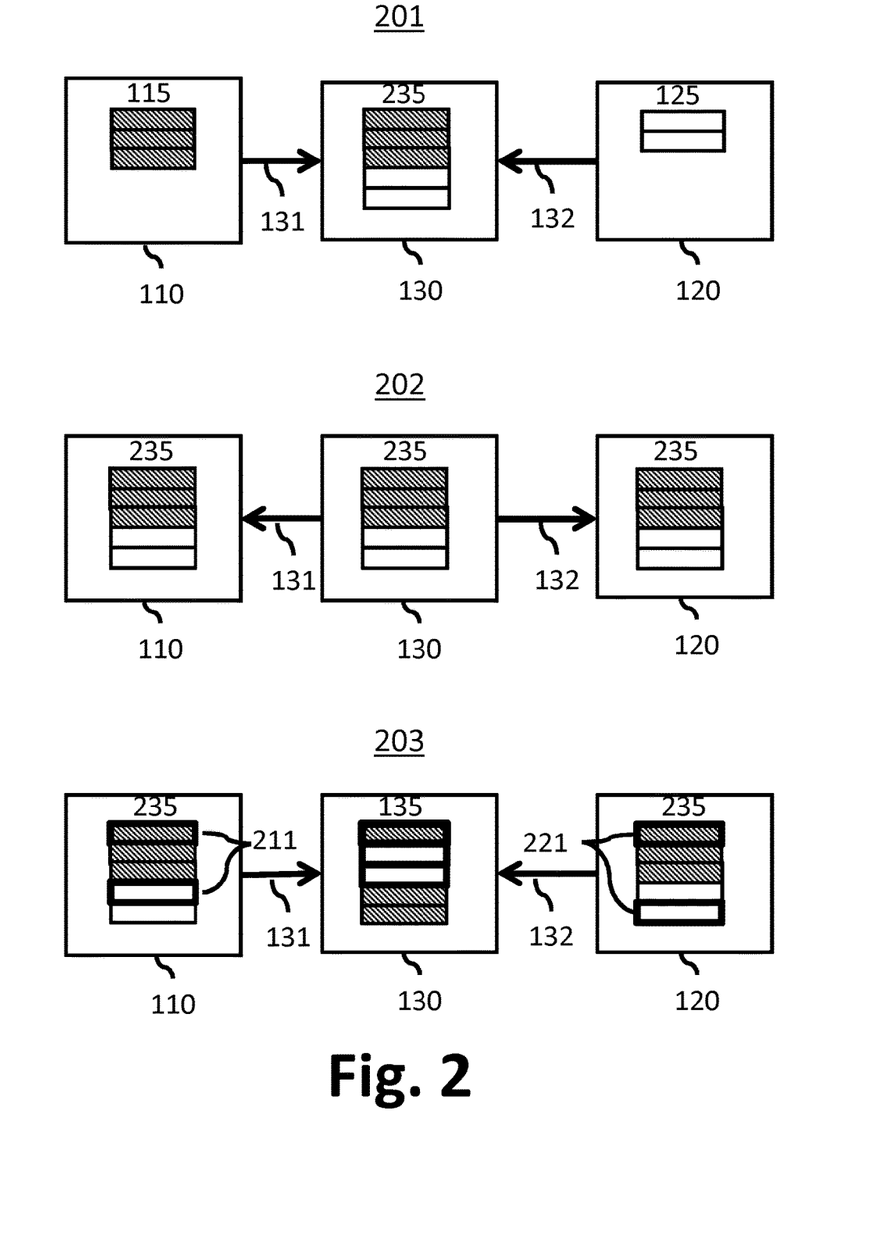
FIG. 2 illustrates the composing of a master playlist based on user votes.

FIG. 2 illustrates the composing of a master playlist based on user votes. Three stages of the composing are illustrated: a first stage 201, a second stage 202 and third stage 203. Each stage illustrates the coordinator unit 130, the first content unit 110 and the second content unit 120, and further illustrates the first land second link 131.

In the first stage 201, the first and second content unit 110 and 120 send their respective playlist 115 and 125 to the coordinator unit 130. The coordinator unit 130 then composes an intermediate playlist 235 using the two playlists 115 and 125. In this example, the intermediate playlist 235 is composed by appending the second playlist 125 to the first playlist 115 in the intermediate playlist 235. Note that, striped boxes mark the first playlist 115 and open boxes mark the second playlist 125, so that the intermediate playlist 235 comprises a mixture of dashed boxes and open boxes. In this example, each box represents a reference to a media content such as a song, so that the intermediate playlist 235 comprises five songs: three songs from the first playlist 115 and two songs from the second playlist 125. Alternatively, the intermediate playlist 235 may only comprise one of the two playlists 115 and 125 being, for example, the first of the two playlists 115 and 125 received by the coordinator unit.

In the second stage 202, the intermediate playlist 235 is shared with the two content units 110 and 120. The coordinator unit 130 sends the intermediate playlist 235 via the first link 131 to the first content unit 110 and via the second link 132 to the second content unit 120. Each of the two content units 110 and 120 now comprise the same intermediate playlist 235 listing media content from both content units 110 and 120.

In the third stage 203, the first and second user vote for specific media content in the intermediate playlist 235. The first user uses the first content unit 110 and the second user uses the second content unit 120. In this example, the first user casts his votes 211 for the first and the fourth song in the intermediate playlist 235 (corresponding to the first song of the first playlist 115 and the first song of the second playlist 125, respectively), whereas the second user casts his votes 221 for the first and the fifth song in the intermediate playlist (corresponding to the first song of the first playlist 115 and the third song of the second playlist 125, respectively). Note that a song that received a vote from the first or second user is indicated as a box with thick outline. The two content units 110 and 120 send the votes to the coordinator unit 130 via the first link 131 and the second link 132, respectively.

The coordinator unit 130 composes a master playlist 135 by sorting the songs in the intermediate playlist 235 based on a popular vote from the first and second user: the most popular song (i.e. receiving the most votes) is at the top of the master playlist 135, whereas the least popular song (i.e. receiving the least votes) is at the bottom of the master playlist 135. In this example, the five songs in the intermediate playlist 235 received the following popular vote (i.e. respective total number of votes): two, zero, zero, one and one. Therefore, the first song in the intermediate playlist 235 is listed as the first song in the master playlist 135, the fourth and fifth song in the intermediate playlist 235 are listed as the second and third song in the master playlist 135, and the second and third song in the intermediate playlist 235 are listed as the fourth and fifth song in the master playlist 135. Note that it is implied that the master playlist 135 in FIG. 2 indicates an order of playing wherein the song at the top of the master playlist 135 corresponds to the song that is to be played first.

Alternatively, the intermediate playlist 135 is sent to the two content units 110 and 120, where the first and second user each choose a song from the intermediate playlist. Each of the two content units 110 and 120 sends the choice of the respective first or second user to the coordinator unit 130. For example, the coordinator unit 130 composes the master playlist 135 by listing the choice of the first received choice as first in the master playlist 135, and the last received choice as second in the master playlist 135. As another example, the coordinator unit 130 composes the master playlist 135 by listing the two chosen media content in random order.

Each of the units 110, 120 and 130 may be comprised by a separate device. Thus, the first and second content unit 110 and 120 may be comprised by a respective first and second content device, whereas the content unit 130 may be comprised by a coordinator device. Alternatively, the coordinator unit 130 and the second content unit 120 combined may be comprised by a coordinator/content device acting as both an coordinator device and a content device, similar to the coordinator/content device 160 of FIG. 1. The first user then uses the first content device, whereas the second user uses the coordinator/content device.

The playback link 151 or 152 may be a wireless link to the playback device that supports playback from the first content device in a streaming manner. The wireless link, for example, uses Bluetooth, WiFi, or another wireless communication technology. The playback device may be an audio system comprising a speaker and a Bluetooth receiver for streaming the music received by the Bluetooth receiver to the speakers. Alternatively, the playback device may be an audio dock system comprising a speaker and a docking unit for holding a coordinator device and for establishing a (wired) playback link with the processing unit via a connector in the docking unit; the first link with the first content device may then be established via a Bluetooth or WiFi connection between the (docked) coordinator device and the first content device. Similarly, the playback device may be a regular audio system (rather than an audio dock system) connected to the coordinator device by a cable: for example, the cable is configured to connect to an audio output jacket (e.g. headphone jacket) at one end of the cable, and to connect to an AUX input jacket of the regular audio system at the other end of the cable.

Similarly, the first link 131 may be a wireless link, for example using Bluetooth, WiFi, or infrared technology, for example. Alternatively, the first link 132 is wired link. Analogously, the second link 132 may also be a wireless link or a wired link.

The coordinator device, the first content device or the second content device may be, for example, a mobile phone, a smart watch (being a wrist watch comprising a computer and a network unit), a mobile music player, or a head-mounted computer comprising a display, a processor, an internal memory and a network unit.

The media content 122 may be stored in an internal memory of a content unit 120 or at an external server 140. For example, a content device comprises a flash memory or a hard drive to store the media content 122. The content device then retrieves the media content 122 by accessing the internal memory. Alternatively, media content 123 is stored at an external server 140. The content device then retrieves the media content by establishing a network link 142 with the external server 140 and retrieving the media content via the network link 142. For example, the external server 140 may be commercial internet media server or server hosting a personal 'cloud' storage.

Media content may comprise audio content comprising music/songs. The audio content may be stored in an MP3 format or another audio format. Alternatively, the media content comprises video content and the playback device comprises a display for displaying the video content. The video content may be stored in a H264, MPEG-2, MPEG-4 or any other video format.

The first content device may comprise the following for implementing the first content unit: a (general purpose) processor, an internal memory for storing the first playlist 115 and the first media content 122, and a network unit for establishing the first link 131 and the first playback link 151. The processor is connected to the internal memory for retrieving and storing data and to the network unit for communication with the coordinator unit 130 and the playback device 150. The second content device may obviously have a similar anatomy.

The processor in the first content device runs software for performing a first content function for operating in the media system 100. The first content function provides a first playlist 115 based on a preference of a first user, wherein the first playlist 115 lists first media content 112. The first content function comprising the steps of: establishing the first link for communication with a coordinator function, sending the first playlist 115 to the coordinator function, receiving a playback command from the coordinator function for playing the first media content 112, retrieving the first media content, and (e) establishing a first playback link 151 with the playback device for playing the first media content 112. A processor in the second content device may run software for a second content function analogous to the first content function.

The coordinator device may comprise the following for implementing the coordinator unit 130: a (general purpose) processor, an internal memory for storing the first playlist 115, the second playlist 125 and the master playlist 135, and a network unit for establishing the first link 131 and the second link 132. The processor is connected to the internal memory for retrieving and storing data and to the network unit for communication with the content units 110, 120 and the playback device 150.

The processor in the coordinator device runs software for performing the coordinator function for operating in the media system 100. The coordinator function comprises the following steps: establishing a first and second link for communication with the respective first and second content function, receiving the first and second playlist from the respective first and second content function, determining a master playlist based on the first and second playlist, selecting a media content according to the master playlist, selecting a content unit listing the selected media content, the selected content unit being one of the first and second content unit, and sending a playback command to the selected content unit for playing the selected media content.

The coordinator device may also act as a content device, by performing both the coordinator function and the second content function (or the first content function) on its processor. Establishing the second link 132 then comprises communication between the coordinator function and the second content function via an internal connection in the processor. Establishing the first link 131 is then done via the network unit, as described above. The coordinator device may then have a single internal memory for storing the first media playlist 115, the second playlist 125, the master playlist 135, and the second media content 122.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. media system for managing playback of media content, the media system comprising:

a coordinator device;
a first content device comprising a first playlist based on a preference of a first user, the first playlist listing a reference to a first media content;
a second content device comprising a second playlist based on a preference of a second user, the second playlist listing a reference to a second media content; and
a playback device, wherein the playback device is different from the first content device and the second content device;
the first content device configured to:
establish a first link for communication with the coordinator device; and
send the first playlist to the coordinator device;
the second content device configured to:
establish a second link for communication with the coordinator device;
send the second playlist to the coordinator device;
the coordinator device configured to:
establish the first and second link for communication with the respective first content device and second content device,
receive the first and second playlist from the respective first and second content devices;
compose an intermediate playlist using the first playlist and second playlist,
send the intermediate playlist to the first content device,
receive from the first content device a selection of the media content selected from the intermediate playlist by the first user, and
list the media content selected by the first user at a top of a master playlist comprising the media content of the first playlist and the second playlist,
select a media content listed by the master playlist;
select a content device listing the selected media content;
the selected content device being one of the first and second content device; and
send a playback command to the selected content device, wherein the selected content device is configured to:
receive the playback command from the coordinator device;
retrieve the selected media content;
establish a playback link with a playback device, that is different than the first content device and the second content device, wherein the playback device is configured to:
receive the selected media content from the selected content device; and
play the selected media content.

2. The media system of claim 1, wherein the coordinator device is configured to:
determine the master playlist based on the content of the first playlist and second playlist using a selection function that selects media content listed in the first and second playlist.

3. The media system of claim 2, wherein the selection function is one of: an alternating selection and a random selection, from the first playlist and second playlist.

4. The media system of claim 1, wherein the coordinator device is configured to:
determined the master playlist based on a preference of a user of the coordinator device.

5. The media system of claim 1, wherein the playback device is configured to:
play the selected media content by streaming the selected media content via the playback link to the playback device.

6. The media system of claim 1, wherein at least one of the first playlist and the second playlist comprises media content representative of audio content.

7. The media system of claim 1, wherein at least one of the first playlist list and the second playlist comprises media content representative of video content.

8. A method for managing playback of media content, comprising a coordinator function,
a first content function,
a second content function; and
a playback device;
the coordinator function, the first content function and a second content function being performed by a coordinator device, a first content device and a second content device, respectively, the first content device and the second content device being portable media devices, the playback device being different from the first content device and the second content device,
the first content function providing a first playlist based on a preference of a first user, the first playlist listing first media content, the first content function comprising
(a) establishing a first link for communication with the coordinator function,
(b) sending the first playlist to the coordinator function,
the second content function providing a second playlist based on a preference of a second user, the second playlist listing second media content, the second content function comprising
(a) establishing a second link for communication with the coordinator function,
(b) sending the second playlist to the coordinator function,
the coordinator function, operable in the coordinator device, performing:
receiving the first and second playlist from the respective first and second content devices over the first communication link and the second communication link, respectively,
determining a master playlist based on the first and second playlist,
selecting a media content according to the master playlist,
selecting a content device listing the selected media content, the selected content device being one of the first and second content device, and
sending a playback command to the selected content device,
the respective one of the first content function and the second content function performed by the selected content device further comprising:
receiving the playback command from the coordinator function,
retrieving the selected media content,
establishing a playback link with the playback device wherein the playback device is configured to:
receive and playback the selected media content.

9. A computer readable storage medium that is not a transitory propagating signal or wave comprising instructions when accessed by a processor instructs the processor to:
coordinate playback of a first media content and a second media content by:

receive a first playlist and a second playlist from the respective first and second content devices;
compose an intermediate playlist using the first playlist and second playlist,
send the intermediate playlist to the first content device,
receive from the first content device a selection of the media content selected from the intermediate playlist by the first user, and
list the media content selected by the first user at a top of a master playlist comprising the media content of the first playlist and the second playlist;
select a media content listed by the master playlist;
select a content device listing the selected media content; the selected content device being one of the first and second content devices; and
send a playback command to the selected content device, wherein the selected content device is configured to:
receive the playback command from the coordinator device;
retrieve the selected media content;
establish a playback link with a playback device configured to:
receive the selected media content from the selected content device; and
play the selected media content.

10. A media system for managing playback of media content, the media system comprising:
a coordinator device;
a first content device comprising a first playlist based on a preference of a first user, the first playlist listing a reference to a first media content, the first content device configured to:
(a) establish a first link for communication with the coordinator device; and
(b) send the first playlist to the coordinator device;
a second content device comprising a second playlist based on a preference of a second user, the second playlist listing a reference to a second media content, the second content device configured to:
(a) establish a second link for communication with the coordinator device;
(b) send the second playlist to the coordinator device;
the coordinator device configured to:
receive the first and second playlist from the respective first and second content devices over the first link and the second link, respectively;
compose an intermediate playlist using at least one of the first and second playlist;
send the intermediate playlist to at least one of the first and second content device;
receive a user vote from the at least one first and second content device, the user vote being related to media content listed by the intermediate playlist, and
compose a master playlist including the media content of the first playlist and the second playlist prioritized based on the intermediate playlist and the user vote,
select a media content listed by the master playlist;
select a content device listing the selected media content; the selected content device being one of the first and second content device; and
send a playback command to the selected content device, wherein the selected content device is configured to:
receive the playback command from the coordinator device;
retrieve the selected media content;
establish a playback link with a playback device , wherein the playback device is configured to:
receive the selected media content from the selected content device; and
play the selected media content.

\* \* \* \* \*